Oct. 3, 1967 TAKESHI ADACHI 3,345,515
NEUTRON GENERATOR SHIELDING ARRANGEMENT
Filed July 15, 1964 3 Sheets-Sheet 1

INVENTOR.
Takeshi Adachi
BY George B. Oujevolk
Attorney

Oct. 3, 1967  TAKESHI ADACHI  3,345,515
NEUTRON GENERATOR SHIELDING ARRANGEMENT
Filed July 15, 1964  3 Sheets-Sheet 2

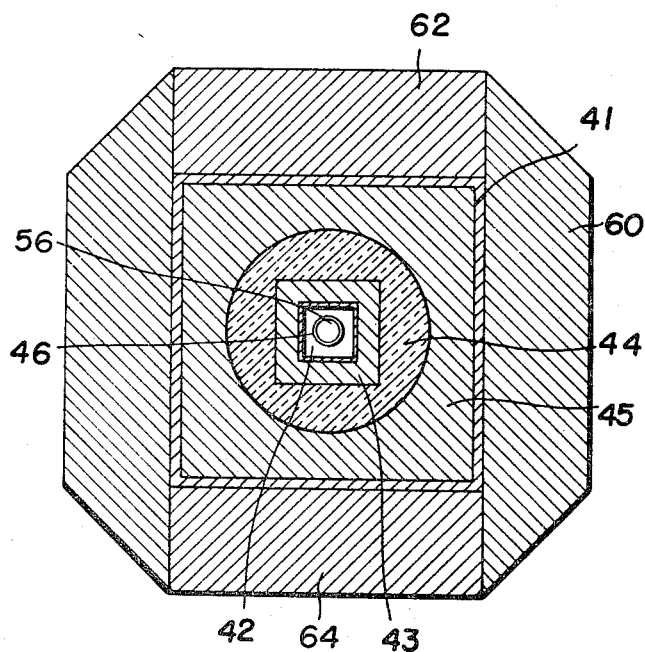

United States Patent Office 3,345,515
Patented Oct. 3, 1967

3,345,515
NEUTRON GENERATOR SHIELDING
ARRANGEMENT
Takeshi Adachi, Kawasaki-shi, Japan, assignor to Tokyo
Shibaura Electric Co., Ltd., Kawasaki-shi, Japan
Filed July 15, 1964, Ser. No. 382,751
Claims priority, application Japan, July 15, 1963,
38/36,049
1 Claim. (Cl. 250—84.5)

This invention relates to a neutron generating apparatus and more particularly to an improved neutron generating apparatus of the type wherein neutrons are generated by accelerating deuterons under an accelerating voltage of about 100 to 200 kv. to bombard a target of tritium so as to generate neutrons by nuclear fusion reaction.

The neutron generating apparatus embodying the principle of this invention is valuable for use in research relating to nuclear reactor engineering and physical, chemical or biological research and experiments.

Conventional neutron generating apparatus generally comprises a horizontal ion accelerating tube having a target adapted to generate neutrons. Since the ion accelerating device is a high voltage device, it must be supported at a suitable height above the ground in order to provide sufficient insulating distance. As a result the target is also located at a height. This construction requires a shielding for neutrons in all directions so that the volume and expense to effectively enclose the target are large.

It is therefore an object of this invention to simplify the construction of such a shield.

Another object of this invention is to provide a new type neutron generating apparatus requiring a minimum amount of shielding material.

Basically the present invention involves the placement of the neutron generating apparatus with its source of electric energy for the ion accelerating tube which must be insulated from the ground in a position supported above the other portions of the apparatus. In this manner the target is located therebelow near the ground floor thereby utilizing the ground as one of the shielding walls whereby a more compact unit can be constructed.

The invention will be better understood from the following description taken in connection with the accompanying drawings and its scope will be pointed out in the appended claim.

In the drawings:

FIG. 4 shows relative arrangement of a neutron source and the shield wherein

FIG. 6 is a sectional view of the apparatus shown in FIG. 5 taken along a line VI—VI.

In order to clearly understand the merit of the invention typical prior art neutron generating apparatus will be described at first by referring to FIGS. 1, 2 and 3.

Figure 1:
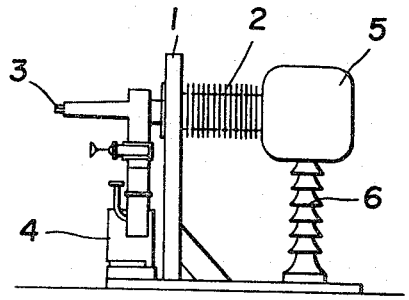
FIG. 1 shows a side elevation of a conventional neutron generating apparatus.

As shown in FIG. 1 the prior neutron generating apparatus comprises a horizontal accelerating tube 2 supported by a support 1, an evacuating device 4 for the accelerating tube, an auxiliary power supply 5 to energize an ion source, not shown, and a supporting insulator 6 therefor.

Figure 2:
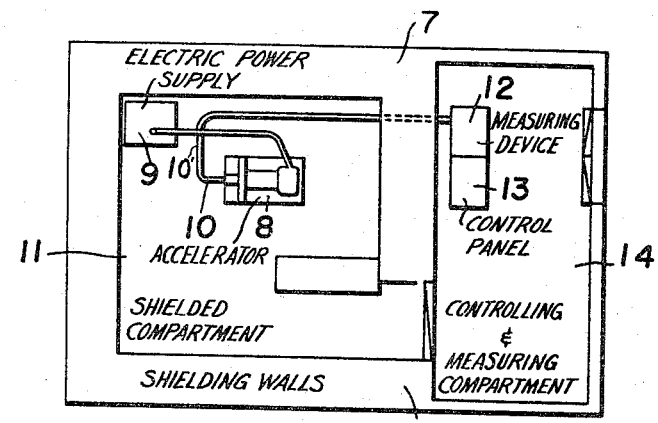
FIG. 2 shows a plan view showing the general arrangement of the neutron generating apparatus shown in FIG. 1.

As shown in FIG. 2 which shows a general view of the neutron generating apparatus shown in FIG. 1, the neutron generating apparatus is installed in a shielded compartment 11 surrounded by shielding walls 7, made of concrete having thickness of about one meter, for example, to limit the leakage of neutrons to the outside of the shielding compartment to an amount less than permissible value. For example, an accelerator 8 and an electric power supply 9 therefor are installed in a shielded compartment 11 and neutrons emitted from the target of the accelerator are controlled by a measuring device 12 and a control panel 13 situated in a controlling and measuring compartment 14. An activation analysis device utilizing neutrons is connected to the target 10 through an air transfer tube 10'. In this arrangement as it is necessary to provide a shield all around the neutron generator the volume occupied by the shield is very large and hence the cost of the shield is very expensive. Moreover the total space necessary for the equipment as a whole is increased by the shield.

Figure 3:
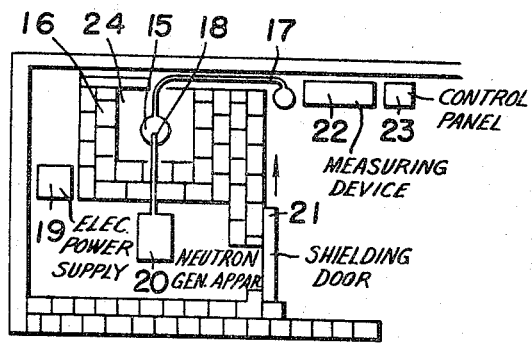
FIG. 3 shows a plan view of still another prior neutron generating apparatus to illustrate the construction of a shield for a neutron irradiating member.

FIG. 3 illustrates still another example of a shield for a neutron irradiating member in a prior neutron generating apparatus such as disclosed in "Nucleonics," vol. 20, No. 1, 1962, page 14. A small chamber 15 termed as a "cave" is disposed in a center of water 24 contained in a compartment which is surrounded by shielding blocks 16 and a target 18 mounted on the extension of a neutron generating apparatus 20 is extending into the cave 15 through an opening in the side wall thereof to subject a sample to neutron irradiation which is disposed in the cave adjacent the target through an air transfer pipe 17. Shielding blocks 16 are piled up in several layers so as to decrease the leakage of neutrons to the outside to an amount below a permissible value. In addition, there are also included a source of electric power supply 19, for acceleration a shielding door 21, a measuring device 22 and a control panel 23. In this arrangement the neutron generating apparatus and the shielding wall are constructed as independent units and are then combined together. Moreover as the cave is situated at a considerable elevation above the ground surface it is required to construct a substantially cubic shielding structure having its center at the target in the cave in order to provide sufficient protection against radiations. Thus the apparatus as a whole is bulky and expensive.

It is the feature of this invention to provide a compact and inexpensive neutron generating apparatus by combining a target member and a radiation shielding structure into a unitary unit. This construction permits confining in a small compartment the neutrons generated by the neutron generating apparatus thus decreasing the volume thereof to about one half of that of the prior art apparatus. Also the neutron generating apparatus can be safely operated in a building of common construction.

Another feature of this invention is to construct a neutron generating apparatus as a vertical structure thereby decreasing the necessary space as well as the amount of shielding material used when compared with a prior horizontal type neutron generating apparatus.

Still another feature of this invention is to locate the neutron source or target close to the ground surface. By this construction a portion of the shield may be directly placed on the ground surface whereas in the horizontal type, all of the shielding material should be supported above the ground surface.

Figure 4A:
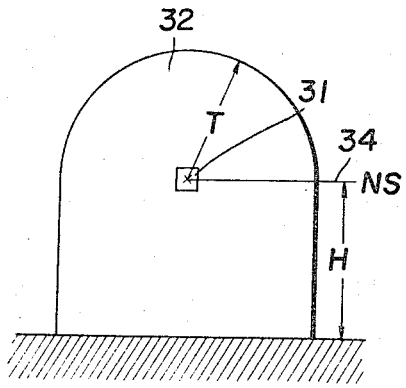
FIG. 4a represents the arrangement of the prior art and FIG. 4b the arrangement of this invention.
Figure 4B:
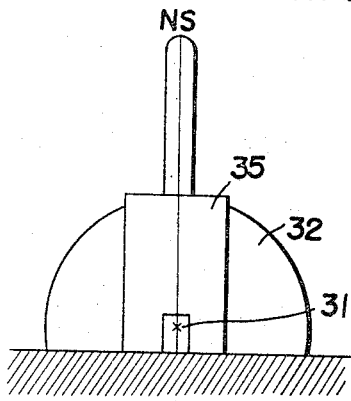

Referring now to FIG. 4 which schematically represents a comparison between relative arrangement of a neutron source 31 and a shield 32 of a prior art apparatus (FIG. 4a) and of an apparatus embodying this invention FIG. 4b. These shields are constructed such that iron, paraffin, water, concrete or cadmium and the like is used to thermalize fast neutrons of 14 mev., for example, generated by the target and to absorb the thermal neutrons so that the wall of the shield is made sufficiently thick enough to limit the radiation outside the shield to permissible level.

Basically, the method of shielding of the neutron generating apparatus shown in FIG. 3 comprises enclosing a target 31 which is supported horizontally at a height H in a spherical shield 32 having its center at the target and having a radius or wall thickness of T, as shown in FIG. 4a. The volume of the shielding material required for this arrangement is represented by $$Va = \tfrac{2}{3}\pi T^3 + \pi H T^2 \qquad (1)$$

by taking $H = T$, $$Va = \tfrac{5}{3}\pi T^3 \qquad (2)$$

The apparatus is generally installed on the ground floor of the building. According to this invention the volume of the shield can be reduced as follows. Thus, as shown in FIG. 4b, according to this invention the neutron generating apparatus is placed vertically so as to bring its target 31 close to the ground floor. The volume $Vb$ of the shielding material required for this vertical type is about $\tfrac{2}{3}\pi T^3$ which is less than ½ of the volume required in the prior art arrangement shown in FIG. 4a. Inasmuch as the target of the neutron generator is situated close to the ground floor the portion 35 of the shield surrounding the target can also be utilized as the support of said neutron generator.

Figure 5:
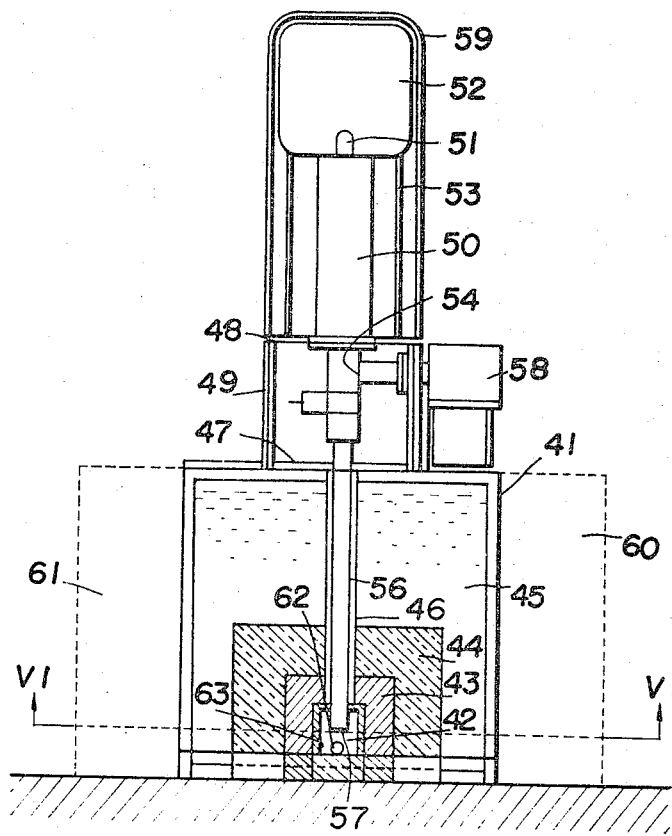
FIG. 5 shows an elevation, partly in section, of one embodiment of this invention.

Referring now to FIGS. 5 and 6 which illustrate one form of the neutron generating apparatus embodying this invention, there is provided a support 41 having a height above the floor surface larger than T in Equation 1. This support not only serves to support the neutron generating apparatus but also functions as a shield surrounding a cave 42 and contains therein iron structure 43, a quantity of paraffin 44, and a water tank 45. An opening 46 extends upwardly from the cave 42 and a sample opening or passage 62 extends horizontally from the cave. The inner surface of the cave 42 is lined with a shield 63 made of cadmium sheet. A vertical accelerating tube 50 is supported on the upper plate 47 of the support 41 through a plate 48 and supporting posts 49. An ion source 51 is mounted on the accelerating tube 50 and energized by an auxiliary power supply 52 supported by an insulating cylinder 53. An evacuation device 58 is connected to the side wall of the base portion 54 of the accelerating tube. Depending from the base portion 54 is an extension 56 which extends to the interior of the cave through the vertical opening 46 in the support 41. A target 57 is secured to the lower end of the extension 56. As shown the accelerating tube 50 and the electric power source 52 are enclosed in an insulating cylinder 59. As the shield shown in FIGS. 5 and 6 provides sufficient shielding effect to the space above the support 41 against neutrons generated by the target 57 contained in the cave 42, leakage of neutrons to the upper surface is small, but shielding action for sides is not sufficient. However this shielding action in the lateral directions can be supplemented by providing additional shield blocks 60, 61 (FIG. 5) and 65, 64 (FIG. 6).

When it becomes necessary during operation to inspect the target 57 and a sample to be irradiated contained in the cave and an air transfer tube and the like easy access to the cave 42 can be had by removing the fore shield block 64 and a portion of the iron structure 43 and paraffin 44, shown in FIG. 5.

While a particular embodiment has been shown it will be understood that various changes and modifications may be made without departing from the true spirit and scope of the invention as defined in the appended claim.

What is claimed is:

A neutron generating apparatus comprising
 a box-like support adapted to be mounted on the ground and provided with a vertical opening at the upper portion thereof;
 an ion accelerating tube having an extension passing through said opening into the interior of said support;
 a target located at one end of said extension;
 a plurality of successive insulating shielding layers contained in said support, the lowermost one of said shielding layers being formed with a cave to position said target therein;
 a sample passage extending horizontally from said cave;
 said shielding layers located to include the ground on which said apparatus is positioned as the bottom wall of said shielding layers;
 whereby such replacing of walls with the ground substantially reduces the vertical dimension of said support;
 a source of electric energy for said ion accelerating tube;
 and means to support said source on said ion accelerating tube.

References Cited

UNITED STATES PATENTS

| | | | |
|---|---|---|---|
| 2,287,619 | 6/1942 | Kallmann et al. | 250—84.5 |
| 2,556,768 | 6/1951 | McKibben | 250—83.1 |
| 3,011,056 | 11/1961 | Gale | 250—71.5 |

RALPH G. NILSON, *Primary Examiner.*

ARCHIE R. BORCHELT, *Examiner.*

S. ELBAUM, *Assistant Examiner.*